United States Patent Office 2,962,492
Patented Nov. 29, 1960

2,962,492
PROCESS FOR THE PRODUCTION OF POLYETHYLENE

Ewald Stiebling and Friedrich Rappen, Oberhausen-Sterkrade, Germany, assignors to Ruhrchemie Aktiengesellschaft, Oberhausen-Holten, Germany No Drawing. Filed Sept. 5, 1956, Ser. No. 607,983

Claims priority, application Germany Sept. 8, 1955

2 Claims. (Cl. 260—94.9)

The polymerization of ethylene at pressures below about 100 kilograms per square centimeter and at temperatures up to about 100° C. is known. In this process, use is made of catalysts which consist of mixtures of organometallic compounds, especially aluminum alkyl compounds, and compounds of metals of the 4th to 6th subgroups of the periodic system, especially titanium compounds. (See Belgian Patents Nos. 533,362 and 534,792.) In this synthesis, the polymerization is generally effected in the presence of an auxiliary liquid. Hydrocarbon fractions in the gasoline or diesel oil boiling range are used as the auxiliary liquid. The polyethylenes produced by the new process, in contrast to those produced by the known high pressure process, have extremely high molecular weights from about 20,000 up to more than 1,000,000.

It has also been suggested to effect the polymerization of ethylene without the use of auxiliary liquids. In this case, the polymerization of ethylene is effected at temperatures ranging below the caking or sintering temperature of the polymerized products within a mixture of solid or liquid polymerization stimulants and reaction products, which is in powder form or in granular state and is continuously and mechanically subdivided and/or agitated in such a manner that all parts of the mixture will react with the ethylene constantly and with as little obstruction as possible.

The yields of polyethylene obtainable with the two abovementioned operating methods ranged between 200 grams and a maximum of 300 grams, based on 1 gram of catalyst charged. Higher yields could not be obtained in general since deactivation of the catalyst mass occurred, which deactivation is probably due to the fact that the polyethylene formed surrounds the active particles of the catalyst mass, so that they are no longer available for further conversion. Both of the two operating methods result in a raw ethylene polymer, which must be freed from the polymerization stimulants contained therein by special measures which often cause considerable difficulties and sometimes require several operational steps.

In the polymerization of ethylene carried out at pressures below about 100 kg./sq. cm. and temperatures below about 100° C. with the use of polymerization stimulants consisting of organometallic compounds, especially aluminum alkyl compounds, in mixture with compounds of metals of the 4th to 6th subgroups of the periodic system, especially titanium compounds, it has surprisingly been found that an increase in the yield to several times the amount of polyethylene can be reached with a simultaneous substantial reduction in the content of ash in the raw ethylene polymer if the pressure prevailing in the reaction vessel is reduced as suddenly as possible in certain intervals, e.g. every 8 to 16 hours. It can be assumed that the effect of this sudden reduction in pressure is to lay bare the enclosed active particles of the catalytic substance thus making them again available for further conversions. Particularly favorable results were obtained when the reduction of the pressure prevailing in the reaction vessel was effected down to atmospheric pressure or even to subatmospheric pressure, although the effect mentioned above will also occur, when, for example, the reaction vessel is suddenly depressurized from 10 kg./sq. cm. to 5 kg./sq. cm.

The new process may be applied with particular success if the polymerization is effected in the presence of auxiliary liquids. It may, however, also be applied when polymerizing in the absence of auxiliary liquids. When working in the presence of auxiliary liquids, vigorous foaming of the mixture contained in the reaction vessel is observed.

It is also possible that, in addition, inert gases may be introduced into the reaction mixture with the same phenomena being observed when suddenly releasing the pressure.

The new process may also be applied when effecting the polymerization in continuous operation. In this case, the amount of catalyst discharged with the polymer must be replaced by a corresponding amount of fresh catalyst mass.

Besides a reduction in the required quantity of catalyst, the success of the working method according to the invention resides chiefly in the fact that the ash content of the raw polyethylene obtained by the polymerization is sufficiently low to eliminate a subsequent de-ashing of this raw polymer for most uses. While the ash content of the raw polymer was formerly about 0.2% by weight, this value is below 0.05% by weight and in most cases below 0.03% by weight when working according to the process of the invention. The process of the invention therefore eliminates a number of operational steps which were previously required for removing the ash from the raw polymer.

The invention will now be more fully described in a specific example, but it should be understood that this is given by way of illustration only and not by way of limitation, and that many changes can be made in the details without departing from the spirit of the invention.

Example 6 liters of a $C_7$—$C_9$ hydrocarbon fraction from the Fischer-Tropsch synthesis were filled into a pressure vessel with stirrer having a capacity of 10 liters. This fraction had previously been purified by hydrogenation over a nickel catalyst effected at 250° C., subsequent refining with concentrated $H_2SO_4$, neutralization by washing, and subsequent drying. A determination of oxygen with phenyl-isopropyl potassium showed an oxygen content of 0.005% by weight. After displacement of the air by highly purified gaseous ethylene and heating-up of the auxiliary liquid to about 50° C., the catalyst solution was added while constantly stirring and passing through ethylene. The catalyst solution had been prepared by adding 0.57 gram of diethyl-aluminum monochloride and 0.90 gm. of titanium tetrachloride to 100 cc. of the same auxiliary liquid and vigorously shaking the mixture for about 1 hour. After the addition of the catalyst solution, the reaction temperature increased to about 65° C. and was slowly increased to about 80° C. in the course of the polymerization. The addition of ethylene was effected in such a manner as to maintain an excess pressure of 2 atmospheres above atmospheric pressure throughout the polymerization.

After a reaction time of 8 hours, the absorption of the ethylene was practically terminated. The polymer precipitated was filtered off and freed from the remaining amount of hydrocarbon by a treatment with steam of 100° C. The quantity of polyethylene obtained was 304 grams. This corresponds to a yield of 206 grams of polyethylene per gram of catalyst. The polyethylene had an ash content of 0.24% by weight.

The polymerization of ethylene was now effected under the same conditions, using the operating method of the invention. After the absorption of ethylene was practically terminated, i.e. after a period of 10 hours, the pressure prevailing in the autoclave was reduced from 2 kg./sq. cm. excess pressure to 0.1 kg./sq. cm. excess pressure within a few minutes. A vigorous ethylene polymerization started at once with foaming and boiling of the reaction mixture. The further addition of ethylene was again effected in such a manner as to maintain an excess pressure of 2 kg./sq. cm. in the autoclave for the duration of the polymerization.

After an additional reaction time of 10 hours, the reduction in pressure was repeated once again and subsequently another synthesis was carried out under the conditions mentioned above.

After a further reaction time of 8 hours, the experiment was discontinued. The polymer precipitated was filtered off and freed from the remaining hydrocarbon by a treatment with water vapor of 100° C. Polyethylene in amount of 1162 grams was obtained. This corresponds to a yield of 790 grams of polyethylene per gram of catalyst. The ash content of the polyethylene was 0.04% by weight.

The entire reaction time in this example is 28 hours.
The reduction of pressure from excess pressure of about 2 kg./sq. cm. can be effected down to sub-atmospheric pressure of about 0.1 kg./sq. cm.

We claim:

1. A process for the continuous polymerization of ethylene in the presence of auxiliary liquids and of catalysts consisting of organometallic compounds in mixture with compounds of metals of the 4th to 6th subgroups of the periodic system at temperatures below about 100° C. and at constant pressure ranging from 2 to 100 kg./cm.$^2$, which comprises suddenly reducing said pressure to atmospheric pressure at intervals of from 8 to 16 hours, immediately returning the pressure to said constant pressure and continuing the polymerization.

2. The process as claimed in claim 1, wherein the quantity of catalyst continuously discharged together with the polymer is replaced by a corresponding amount of fresh catalyst.

References Cited in the file of this patent

UNITED STATES PATENTS

| | | |
|---|---|---|
| 2,827,447 | Nowlin et al. | Dec. 30, 1955 |
| 2,852,501 | Richards et al. | Sept. 16, 1958 |
| 2,899,417 | Hooker | Aug. 11, 1959 |

FOREIGN PATENTS

| | | |
|---|---|---|
| 533,362 | Belgium | May 16, 1955 |
| 1,006,162 | Germany | Apr. 11, 1957 |